US008922160B2

(12) United States Patent
Inoue

(10) Patent No.: US 8,922,160 B2
(45) Date of Patent: Dec. 30, 2014

(54) NON-CONTACT TYPE POWER RECEIVING APPARATUS, ELECTRONIC EQUIPMENT AND CHARGING SYSTEM USING THE POWER RECEIVING APPARATUS

(75) Inventor: Tetsuo Inoue, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 1076 days.

(21) Appl. No.: 12/674,347

(22) PCT Filed: Aug. 20, 2008

(86) PCT No.: PCT/JP2008/064787
§ 371 (c)(1),
(2), (4) Date: Feb. 19, 2010

(87) PCT Pub. No.: WO2009/025279
PCT Pub. Date: Feb. 26, 2009

(65) Prior Publication Data
US 2011/0210696 A1 Sep. 1, 2011

(30) Foreign Application Priority Data
Aug. 21, 2007 (JP) ................................. 2007-214503

(51) Int. Cl.
H02J 7/00 (2006.01)
H01F 38/14 (2006.01)
H01F 27/36 (2006.01)
H01F 27/28 (2006.01)
H02J 5/00 (2006.01)

(52) U.S. Cl.
CPC .............. H01F 38/14 (2013.01); H01F 27/365 (2013.01); H01F 27/2804 (2013.01); H01F 2038/143 (2013.01); H02J 5/005 (2013.01)
USPC .......................................... 320/108; 336/200

(58) Field of Classification Search
CPC ....................................................... H02J 7/025
USPC .......................................................... 320/108
See application file for complete search history.

(56) References Cited

U.S. PATENT DOCUMENTS 4,640,871 A * 2/1987 Hayashi et al. ................ 428/611
6,593,841 B1 * 7/2003 Mizoguchi et al. ........... 336/200
(Continued)

FOREIGN PATENT DOCUMENTS

JP 62 36512 3/1987
JP 8 79976 3/1996
(Continued)

Primary Examiner — Edward Tso
Assistant Examiner — Johali Torres Ruiz
(74) Attorney, Agent, or Firm — Oblon, Spivak, McClelland, Maier & Neustadt, L.L.P.

(57) ABSTRACT

A non-contact type power receiving apparatus including: a power receiving coil having a spiral coil; a rectifier; a secondary battery; an electronic device operated by being supplied with direct voltage from the secondary battery, wherein a composite magnetic body is provided to at least one portion between the secondary battery and the spiral coil, and a portion between the electronic device and the spiral coil. The composite magnetic body includes at least first and other layers of magnetic sheets through an insulating layer in which when a relative magnetic permeability of the first magnetic sheet provided to a side of the spiral coil is μd, a thickness of the first magnetic sheet is tu, an average relative magnetic permeability of the other magnetic sheets other than the first magnetic sheet is μu, and a total thickness of the other magnetic sheets is tu, the composite magnetic body satisfies the following relations: μd·td≤60 [mm]; and μu·tu≥100 [mm].

15 Claims, 3 Drawing Sheets

(56) References Cited

U.S. PATENT DOCUMENTS

| | | | |
|---|---|---|---|
| 6,603,382 B1 * | 8/2003 | Komai et al. | 336/200 |
| 2006/0083931 A1 * | 4/2006 | Wadle et al. | 428/432 |
| 2007/0230042 A1 * | 10/2007 | Fujiwara | 360/123 |
| 2008/0198560 A1 * | 8/2008 | Fujiwara et al. | 361/728 |
| 2008/0211455 A1 * | 9/2008 | Park et al. | 320/108 |
| 2008/0246571 A1 * | 10/2008 | Guenther | 335/297 |

FOREIGN PATENT DOCUMENTS

| | | |
|---|---|---|
| JP | 11 176677 | 7/1999 |
| JP | 2000 91113 | 3/2000 |
| JP | 2003 257751 | 9/2003 |
| WO | 2007 080820 | 7/2007 |
| WO | 2007 111019 | 10/2007 |

* cited by examiner

NON-CONTACT TYPE POWER RECEIVING APPARATUS, ELECTRONIC EQUIPMENT AND CHARGING SYSTEM USING THE POWER RECEIVING APPARATUS

TECHNICAL FIELD

The present invention relates to a non-contact (contactless) type power receiving apparatus, an electronic equipment (electronic apparatus) and a charging system (battery charging system) using the non-contact type power receiving apparatus that are capable of performing a non-contact power charging in various electronic equipments such as cellular phone, video camera and so on.

BACKGROUND ART

In recent years, a development of handhold communication gadgets is remarkable. Especially, downsizing and reduction in weight of mobile phones have advanced. Further, with respect to also various electronic equipments such as video camera (handy camera or the like), codeless phone, lap-top personal computer (notebook type personal computer) other than the mobile phone, such the downsizing and reduction in weight have been also advanced.

Since these electronic equipments are provided with a secondary battery to an electronic equipment body, the electronic equipments can be available without plugging in, so that a portability and convenience have been greatly improved. At the present time, a capacity of the secondary is limited to some extent, so that the secondary battery is necessary to be performed with a power-charging operation at least once every several days to several weeks.

As a power charging method, there are two types of charging methods: a contact-type charging system; and a non-contact type charging system. The contact-type charging system is a system in which an electrode of a power receiving apparatus and an electrode of a power supplying apparatus are directly contacted to each other thereby to perform the power charging. The contact-type charging system has a simple structure for constituting the apparatus, so that the contact-type charging system has been generally adopted in wide application field.

However, in accordance with the progress of the downsizing and reduction in weight of the electronic equipments in recent years, there has been posed problems such that a weight of each electronic equipments is reduced, so that a contact pressure between the electrode of the power receiving apparatus and the electrode of the power supplying apparatus becomes insufficient thereby to cause a charging defect (charging fault). Further, the secondary batter has a small resistance to heat, so that it is necessary to avoid a temperature rise of the secondary battery, and a circuit design requires to be carefully performed so as not to cause an over discharge and an overcharge. In order to cope with these problems, the non-contact type charging system has been reviewed in these days.

The non-contact type charging system is a power charging system utilizing an electromagnetic induction caused by coils provided to both the power receiving apparatus and the power supplying apparatus. In this type of the charging system, due to the non-contact type, there is no need to pay attention to the contact pressure between the electrodes of the two apparatuses. Further, it is unnecessary to pay attention to the contact pressure, so that a stable charging voltage can be supplied without being influenced by the contacting state of the electrodes of the apparatuses.

The conventional non-contact type charging system has been used for electronic equipments such as electric toothbrush, electric shaver or the like that are driven by a low power consumption and require a long charging time. As the secondary battery at that time, a nickel-hydrogen battery is mainly used, so that most of the nickel-hydrogen batteries require a long charging time of about 8 hours. In recent years, as a novel secondary battery, a high capacity and high density batteries such as lithium-ion secondary battery or the like have come into existence. As a result, with respect to the electronic equipments such as mobile phone, personal computer or the like that are driven by a high power consumption and require a rapid charging operation, the non-contact type charging system has been eagerly reviewed in these days.

As one example of the non-contact type charging apparatus, there have been proposed systems in Japanese Unexamined Patent Application Publication No. 11-265814 (Patent Document 1) or Japanese Unexamined Patent Application Publication No. 2000-23393 (Patent Document 2). Both systems adopt a structure in which a ferrite core is used as a magnetic core and a coil is wound around the magnetic core thereby to realize the apparatus which is reduced in size.

Further, in the charging apparatus disclosed in Japanese Unexamined Patent Application Publication No. 9-190938 (Patent Document 3), ferrite powder and amorphous powder are mixed thereby to form a resin substrate and a coil or the like is mounted on the resin substrate thereby to realize the charging apparatus reduced in size and thickness.

However, when ferrite is worked to be thin shape, the thin ferrite becomes brittle and has a low impact resistance, so that there has been posed a problem such that the power receiving system turns out to be defective due to a dropping or collision or the like of the apparatus. Further, in order to reduce a size in thickness of a power receiving portion so as to correspond to the reduction in thickness of the electronic equipment, there has been adopted a planar coil which is formed by printing a metal powder paste onto a coil. As one example of structure for strengthening bondage by using the planar coil and a magnetic sheet, there have been proposed the structures disclosed in Japanese Unexamined Utility Model Application Publication No. 58-80753 (Patent Document 4), Japanese Unexamined Patent Application Publication No. 4-122007 (Patent Document 5) or Japanese Unexamined Patent Application Publication No. 8-148360 (Patent Document 6). In these proposed structures, a magnetic body (magnetic sheet) is used as a core material for strengthening the bondage between a primary coil and a secondary coil.

On the other hand, when an electric transmission rate is increased to be large, defects due to heat generation are liable to occur at portions not only the bondage between adjacent transformers but also peripheral parts of the transformers. That is, in a case where the planar coil is used, a magnetic flux passing through the planar coil is interlinked to a substrate or the like provided inside the equipment, so that a temperature of an inside of the apparatus is increased to generate heat due to eddy current caused by electromagnetic induction. As a result, there has been posed a problem such that high electric power cannot be transmitted and it takes long time to charge the electricity.

To cope with this problem, the magnetic body (magnetic sheet) is used as also a shielding member with respect to a rear surface. In order to obtain a sufficient shielding effect, it has been considered that if the magnetic body (magnetic sheet) has the larger magnetic permeability or the wider area or the larger thickness, the more effective shielding effect can be obtained.

Further, in order to increase the electric transmission rate, it is required to increase the electric power. However, when the electric transmission is continued to a metallic body, the metallic body generates heat due to the eddy current caused in the metallic body. Therefore, it is necessary to provide the following safety system. For example, in a case where a coil of a power transmitting (power supplying) apparatus is a primary coil while a coil of a power receiving apparatus is a secondary coil and the primary coil is used as an antenna of RF-ID tag (radio-frequency-identification tag), the safety system judges whether or not the secondary coil exists at upper portion of the primary coil on the basis of a RF signal.

However, in this case, when inductance of the primary coil is greatly changed in accordance with a positional relationship between the magnetic body (magnetic sheet) and the coil of the power transmitting apparatus side, a resonant frequency of a resonant circuit provided to a side of the primary coil for power transmitting is also greatly varied, so that there has been caused defects such that a sufficient resonance cannot be obtained and the above antenna cannot function well.

Patent Document 1: Japanese Unexamined Patent Application Publication No. 11-265814
Patent Document 2: Japanese Unexamined Patent Application Publication No. 2000-23393
Patent Document 3: Japanese Unexamined Patent Application Publication No. 9-190938
Patent Document 4: Japanese Unexamined Utility Model Application Publication No. 58-80753
Patent Document 5: Japanese Unexamined Patent Application Publication No. 4-122007
Patent Document 6: Japanese Unexamined Patent Application Publication No. 8-148360

DISCLOSURE OF INVENTION

As described above, in the power receiving apparatus for the conventional non-contact type charging system, the magnetic body (magnetic sheet) having a high permeability and a large volume is provided to a surface of the secondary coil, the surface being opposite to a side of the primary coil, for the purpose of strengthening the bondage to improve an efficiency of the electric power transmission and for the purpose of improving the shielding property thereby to suppress the heat generation. According to the above conventional arrangement, there has been posed problems such that a fluctuation in inductance of the primary coil becomes notable, and an operating condition of the resonance circuit is disadvantageously deviated from resonance condition capable of exhibiting a sufficient effect in accordance with the positional relationship between the magnetic body and the primary coil.

The present invention had been achieved to solve the aforementioned problems, and an object of the present invention is to provide a power receiving apparatus capable of improving the resonating property (resonation property) and capable of suppressing the heat generation. Therefore, according to the electronic equipment and the power receiving system using the power receiving apparatus of the present invention, it becomes possible to increase the transmitting electricity, and it becomes also possible to shorten the charging time.

To achieve the above object, the present invention provides a non-contact type power receiving apparatus comprising a power receiving coil having a spiral coil; a rectifier for rectifying alternative voltage (AC voltage) generated at the power receiving coil; a secondary battery for being charged with direct voltage (DC voltage) which is rectified by the rectifier; and an electronic device operated by being supplied with the direct voltage from the secondary battery, wherein the non-contact type power receiving apparatus further comprises a composite magnetic body which is provided to at least one portion between the secondary battery and the spiral coil, and a portion between the electronic device and the spiral coil, wherein the composite magnetic body comprises at least two layers including first and other layers of magnetic sheets (magnetic ribbons) through an insulating layer in which when a relative magnetic permeability of the first magnetic sheet provided to a side of the spiral coil is denoted as $\mu d$, a thickness of the first magnetic sheet is denoted as $tu$, an average relative magnetic permeability of the other layers of magnetic sheets other than the first magnetic sheet is denoted as $\mu u$, and a total thickness of the other layers of magnetic sheets is denoted as $tu$, the composite magnetic body satisfy the following relations: $\mu d \cdot td \leq 60$ [mm]; and $\mu u \cdot tu \geq 100$ [mm].

In the above non-contact type power receiving apparatus, it is preferable that the composite magnetic body satisfy the following relation: $(\mu u \cdot tu)/(\mu d \cdot td) \geq 10$.

Further, it is also preferable that the first magnetic sheet has a surface area larger than that of the other layers of the magnetic sheets, it is more preferable that the insulating layer of the composite magnetic body is composed of resin containing magnetic powder, and it is also preferable that a distance between the first magnetic sheet and the other magnetic sheets is 30 μm or more. Furthermore, it is also preferable that a total thickness of the composite magnetic body is 0.3 mm or less, and the secondary battery is a Li-ion secondary battery.

The non-contact type power receiving apparatus according to the present invention is suitably applied to various electronic equipments. Further, when the electronic equipment of this invention is provided to a non-contact type power charging apparatus, there can be also provided a charging system capable of charging electricity to the electronic equipment.

EFFECTS OF THE INVENTION

According to the present invention, the composite magnetic body comprising a plurality of magnetic sheets (magnetic ribbons) is provided to at least one portion between the spiral coil (power receiving side spiral coil: a secondary coil) and the secondary battery, and a portion between the rectifier and the spiral coil. Therefore, magnetic flux generated from a power charging side spiral coil (a primary coil) is prevented from interlinking with a circuit board and the secondary battery or the like, and inductance variation in the preliminary coil, which is caused by absence or presence of the secondary coil, is controlled while noise and heat generation originated by induced electromotive force (electromagnetic induction) are suppressed, so that a resonating property of a resonance circuit constituted by the primary coil is improved whereby an oscillation can be effectively controlled.

BEST MODE FOR CARRYING OUT THE INVENTION

Figure 1:
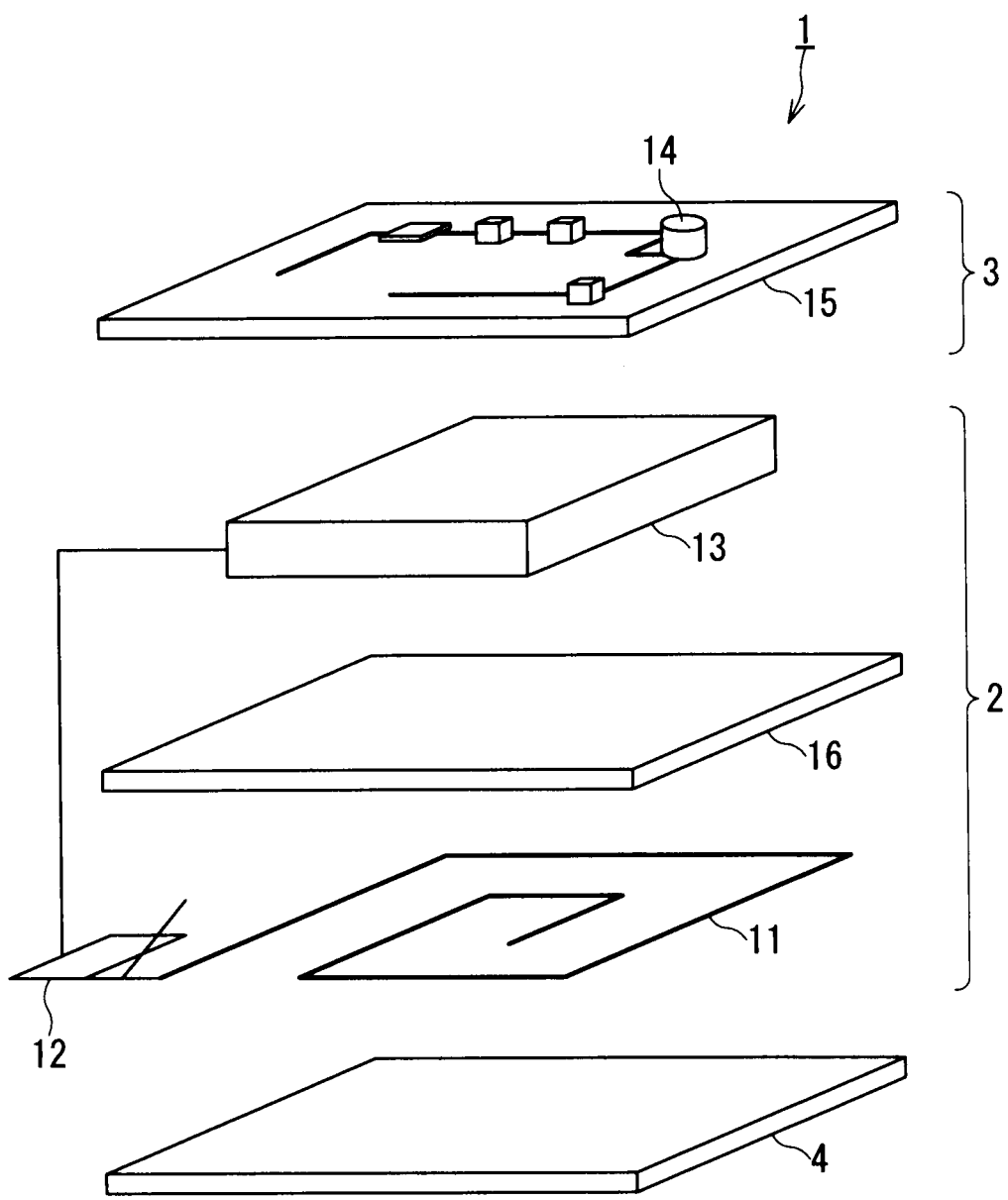
FIG. 1 is an exploded perspective view showing an embodiment of the power receiving apparatus according to the present invention.
Figure 2:
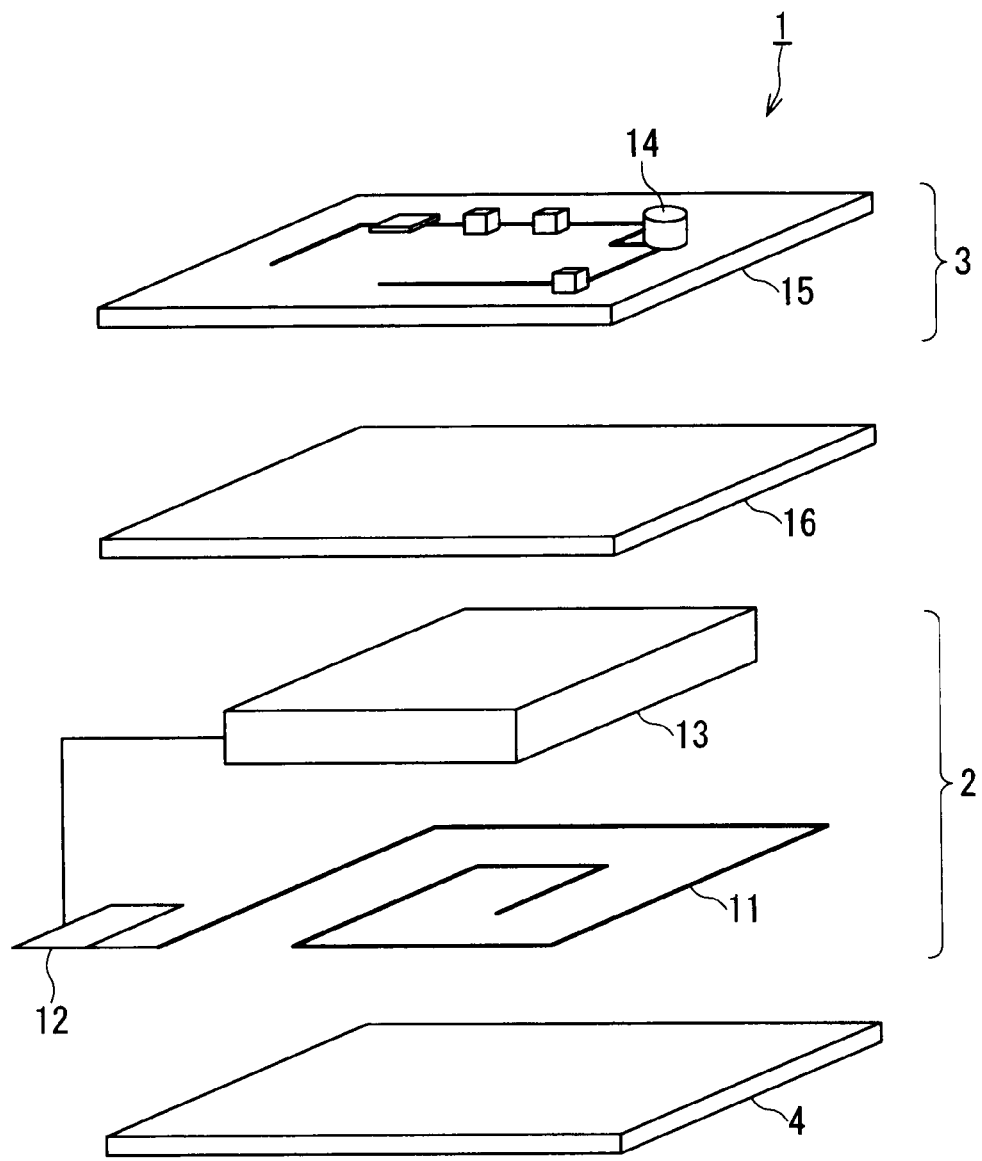
FIG. 2 is an exploded perspective view showing another embodiment of the power receiving apparatus according to the present invention.

FIG. 1 is an exploded perspective view showing one embodiment of the power receiving apparatus according to the present invention. FIG. 2 is an exploded perspective view showing another embodiment of the power receiving apparatus according to the present invention. In the drawings, a reference numeral 1 denotes an electronic apparatus, a reference numeral 2 denotes a power receiving apparatus, a reference numeral 3 denotes an electronic apparatus body, a reference numeral 4 denotes a casing, a reference numeral 11 denotes a spiral coil, a reference numeral 12 denotes a rectifier, a reference numeral 13 denotes a secondary battery, a reference numeral 14 denotes an electronic device provided to the electronic apparatus body, a reference numeral 15 denotes a circuit board for mounting the electronic device, and a reference numeral 16 denotes a composite magnetic body.

Further, FIG. 1 shows an embodiment where the composite magnetic body 16 is provided to a portion between the spiral coil 11 and the secondary battery 13, while FIG. 2 shows an embodiment where the composite magnetic body 16 is provided to a portion between the electronic device 14 and the spiral coil 11.

At first, the power receiving apparatus of the present invention comprises: the spiral coil; the rectifier; the secondary battery; and the electronic device. The spiral coil is not particularly limited, but may be formed by winding metal wire such as copper or the like, or formed by a planar coil which is formed by printing metal powder paste, followed by drying the printed paste. Further, a winding shape of the spiral coil is not particularly limited, but may be formed into circular, elliptical-shape, or rectangular-shape, polygonal-shape. A winding number of the spiral coil may be controlled in accordance with the required characteristics.

Further, the rectifier is formed of various semiconductor elements such as transistor, diode and so on. Furthermore, the number of the rectifier is arbitrarily specified, so that one or at least two rectifiers are provided so as to meet requirements. In this regard, although the rectifier 12 is provided to an antenna-side of the circuit board 15 as shown in FIG. 1, the rectifier 12 may also be provided to a surface opposed to the antenna. Further, the rectifier may also be formed by a film-forming technology such as TFT or the like.

The secondary battery 13 is capable of charging/discharging electricity, and there can be used secondary batteries having various shapes such as plain-shape, button-shape. The electronic device 14 denotes various elements such as resistance element, capacitative element, inductance element, controlling element or the like for constituting a circuit. Further, the circuit board 15 is an insulating board composed of resin film or ceramic substrate or the like onto which the electronic devices are mounted thereby to form the circuit.

The composite magnetic body 16 comprises at least two layers of magnetic sheets (magnetic ribbons) through an insulating layer. In the magnetic sheets of at least two layers, a magnetic sheet provided to a side of the spiral coil is referred as a first magnetic sheet, while magnetic sheets other than the first magnetic sheet are referred as subsequent (after second, or the other) magnetic sheets. The magnetic sheets after second are called as a second magnetic sheet, a third magnetic sheet, —and so on in turn from a side of the first magnetic sheet. Therefore, in case of two layers of the magnetic sheets, the composite magnetic body comprises: a first magnetic sheet and a second magnetic sheet from the side of the spiral coil. While, in case of three layers of the magnetic sheets, the composite magnetic body comprises: a first magnetic sheet, a second magnetic sheet and a third magnetic sheet from the side of the spiral coil.

In the present invention, when a relative magnetic permeability of the first magnetic sheet constituting the composite magnetic body is denoted as µd, a thickness of the first magnetic sheet is denoted as td (mm), an average relative magnetic permeability of the other layers of magnetic sheets other than the first magnetic sheet is denoted as µu, and a total thickness of the other layers of magnetic sheets is denoted as tu (mm), the composite magnetic body satisfy the following relations: µd·td≤60; and µu·tu≥100. The average relative magnetic permeability of the other layers of (after second) magnetic sheets other than the first magnetic sheet is obtained by measuring the respective relative magnetic permeabilities of each of the magnetic sheets, and followed by averaging the respective relative magnetic permeabilities. Further, the total thickness is obtained by measuring the respective thicknesses of each of the magnetic sheets, and followed by totalizing the respective thicknesses. A value (relative magnetic permeability of the magnetic sheet×thickness of the magnetic sheet) indicates a magnetic resistance in a magnetic circuit.

In the present invention, the structure is specified so that the composite magnetic body satisfies the following relations: µd·td≤60; and µu·tu≥100. Since the first magnetic sheet is provided to a closest portion to the spiral coil, the first magnetic sheet is liable to affect resonating frequency at the time of charging operation. Therefore, when the relation: µd·td≤60 is established, the magnetic resistance can be increased and the magnetic flux can be prevented from being concentrated to the first magnetic sheet, so that it becomes possible to suppress a loss arisen in the first magnetic sheet and to prevent the resonating property from lowering.

Further, when the relation: µu·tu≥100 is established, the magnetic resistance can be decreased and a shielding effect is improved, so that an eddy current generated at the substrate or the like provided in the devices is suppressed thereby to reduce a heat generation. Namely, when only the first magnetic sheet is provided, the shielding effect is insufficient and the heat generation cannot be suppressed. While, when only the other (after second) magnetic sheets are provided, the resonating property is lowered. For example, when only the magnetic sheets each satisfying the relation: µu·tu≥100 are formed into a multi-layered structure, the shielding property is improved, but the resonating property is disadvantageously lowered. To solve the above problem, the present invention adopts a structure in which the first magnetic sheet satisfying the relation: µd·td≤60 is provided to the side of the spiral coil.

Further, it is preferable that the structure satisfies a relation: (µu·tu)/(µd·td)≥10. As described above, the first magnetic sheet has a main function of improving the resonating property, while the other (after second) magnetic sheets have a main function of improving the shielding property. When satisfying the relation: (µu·tu)/(µd·td)≥10, functional contributions of the first and the other magnetic sheets become clear, thereby to improve the characteristics of the power receiving apparatus.

In this regard, an upper limit of the ratio of (µu·tu)/(µd·td) is not particularly limited, but the upper limit is preferably set to 70 or less. Even if the ratio of (µu·tu)/(µd·td) exceeds 70, the same effect can be obtained. However, it is necessary to extremely enlarge µu or tu, or make µd or td extremely small, so that it becomes difficult to manage a manufacturing control.

Further, it is more preferable that the first magnetic sheet has a surface area larger than that of the other layers of the magnetic sheets constituting the composite magnetic body. In a case where a plurality of the other (after second) magnetic sheets are provided, the surface area of the other magnetic sheets is defined as a largest surface area among the respective other magnetic sheets. When the surface area of the first magnetic sheet is larger than that of the other layers of the magnetic sheets, it becomes possible to prevent the resonating property from lowering.

Further, the insulating layer constituting the composite magnetic body is not particularly limited, but the insulating layer may be formed as an inorganic insulating layer, an organic insulating layer or the like. The insulating layer is preferably formed as the organic insulating layer using insulating resin. The insulating resin can be used in various forms such as an adhesive agent, a film, rubber or the like. Such insulating resin may be provided in accordance with a size of the magnetic sheet.

Further, the insulating layer can be also formed by combining the insulating film, adhesive agent, rubber or the like. One example is an insulating film with an adhesive agent. Furthermore, as examples of the insulating resin, for example, natural rubber, neoprene rubber, chloroprene rubber, silicone rubber, Hypalon; other synthetic rubber, PVC resin, ethylene-vinyl acetate copolymer resin, acrylic resin, silicone resin, polyurethane resin, polypropylene resin, polyester resin, polyimide resin, polycarbonate resin, polyethylene terephthalate resin, polyethylene naphthalate resin, polybuthylene naphthalate resin, polyester elastomer resin, fluorine resin, other synthetic resins can be used. In a case where the insulating layer is not provided and the first and the other magnetic sheets are directly contacted to face-to-face, an effect of sharing roles (functions) cannot be sufficiently obtained. Namely, when the first and the other magnetic sheets are directly surface-contacted to each other, the contacted magnetic sheets function as one magnetic sheet.

Further, the insulating layer is sufficient as far as the insulating property for the respective magnetic sheets is maintained. As to an outermost layer of the magnetic sheet, whether the insulating layer is provided or not will make no problem. However, when the insulating layer is provided to the outermost layer of the magnetic sheet, an insulating property against peripheral members (circuit board, secondary battery, spiral coil) can be maintained, thus being preferable. One example of the insulating layer is shown in FIG. 1.

Figure 3A:
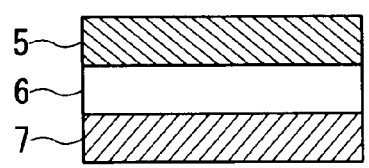
FIG. 3 is a cross sectional view showing one embodiment of a composite magnetic body comprised by the power receiving apparatus according to the present invention.
Figure 3B:
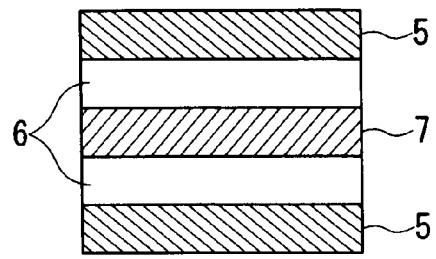

FIG. 3A shows one Example in which an adhesive layer and an insulating film as the insulating layers are provided to one surface of the magnetic sheet, while FIG. 3B shows another Example in which the adhesive layer and the insulating film as the insulating layers are provided to both surfaces of the magnetic sheet. In figures, a reference numeral 5 denotes the insulating film, a reference numeral 6 denotes the adhesive layer, and a reference numeral 7 denotes the magnetic sheet. When this magnetic sheet and the insulating layer are laminated and the resultant laminated body is multi-layered, thereby to form a composite magnetic body for use in an embodiment of the present invention.

Further, it is preferable that the insulating layer of the composite magnetic body is composed of resin containing magnetic powder. When the magnetic powder is contained in the insulating layer, the shielding effect can be improved and the heat generation can be sufficiently prevented. Examples of the magnetic powder include: ferrite powder, Sendust powder, amorphous powder or the like.

Further, in the above composite magnetic body, it is preferable that a distance between the first magnetic sheet and the other magnetic sheets is 30 μm or more. The distance between the first magnetic sheet and the other magnetic sheets is defined as a thickness of an insulating layer for insulating the first and second magnetic sheets. Therefore, the preferable thickness of the insulating layer is 30 μm or more.

As described hereinbefore, when the first and the other magnetic sheets are directly surface-contacted to each other, the contacted magnetic sheets function as one magnetic sheet. Therefore, it is necessary to prevent the surface-contact of the first and second magnetic sheets by interposing the insulating layer therebetween. On the other hand, when the thickness of the insulating layer is excessively thin, there may be a fear that the insulating effect between the two magnetic sheets becomes insufficient. Therefore, it is preferable to set the thickness of the insulating layer to 30 μm or more.

In this connection, an upper limit of the thickness of the insulating layer (i.e., a distance between the first magnetic sheet and the other magnetic sheets) is preferably set to 200 μm or less. When the thickness of the insulating layer is excessively thick, the distance between the first magnetic sheet and the other magnetic sheets is excessively apart, so that the effect of sharing rolls cannot be sufficiently obtained. In addition, a total thickness of the composite magnetic body becomes excessively large, so that it becomes difficult to make the composite magnetic body to be compact in size. In this regard, the total thickness of the composite magnetic body is preferably set to 0.3 mm or less.

Further, the magnetic sheet constituting the composite magnetic sheet is not particularly limited as far as the magnetic sheet satisfies the aforementioned relative permeability×thickness. However, the magnetic sheet may be preferably formed of magnetic materials such as Co-type amorphous alloy, Fe-type amorphous alloy, Fe-type micro crystalline alloy, permalloy. Each of these magnetic materials can be easily prepared by a roll-quenching method (single roll method, double role method) or rolling method, so that it is easy to obtain a magnetic sheet (magnetic thin ribbon) having an average thickness of 100 μm or less. In addition, it is also easy to control the relative permeability of the resultant magnetic sheets.

Furthermore, as the Co-type amorphous alloy and the Fe-type amorphous alloy, it is preferable to use an alloy having the following general formula (1).

$$\text{General formula: } (T_{1-a}M_a)_{100-b}X_b \tag{1}$$

wherein T denotes at least one element selected from the group consisting of Co and Fe, M denotes at least one element selected from the group consisting of Ni, Mn, Cr, Ti, Zr, Hf, Mo, V, Nb, W, Ta, Cu, Ru, Rh, Pd, Os, Ir, Pt, Re and Sn, X denotes at least one element selected from the group consisting of B, Si, C and P, and a, b satisfy relation formulas: $0 \leq a \leq 0.3$, $10 \leq b \leq 35$ at %. In the above general formula (1), when both Co and Fe are contained as T element and amount of Co is relatively large, the alloy is called as the Co-type amorphous alloy. In contrast, when amount of Fe is relatively large, the alloy is called as the Fe-type amorphous alloy.

In the above general formula (1), T element is used for controlling the composition ratio in accordance with the required magnetic characteristics such as magnetic flux density, magneto striction, iron loss or the like. Addition amount of the M element is preferably set to 0.3 or less as a value. When the addition amount of the M element is excessively large, the amount of T element is relatively reduced, so that the magnetic characteristic of the amorphous magnetic alloy sheet is disadvantageously lowered. It is practically preferable that a value indicating the addition amount of M element is practically set to 0.01 or more. The value a is more preferable to set to 0.15 or less.

X element is an essential element required for obtaining an amorphous alloy. In particular, boron (B) is an effective element for making the alloy amorphous. Si (silicon) is an effective element for promoting a formation of the amorphous phase and for rising a crystallizing temperature. When the content of X element is excessively large, the permeability is lowed and brittleness is arisen in the alloy. In contrast, when the content of X element is excessively small, it becomes difficult to make the alloy amorphous. Under these circumstances, it is preferable to set the content of X element to within a range of 10 to 35 at %. It is more preferable to set the content of X element to within a range of 15 to 25 at %.

Further, as the Fe-type micro crystalline alloy, it is preferable to use an alloy having the following general formula (2).

General formula: $Fe_{100-c-d-e-f-g-h}A_cD_dE_eSi_fB_gZ_h$ (2)

wherein A denotes at least one element selected from the group consisting of Cu and Au, D denotes at least one element selected from the group consisting of Ti, Zr, Hf, V, Nb, Ta, Cr, Mo, W, Ni, Co and rare earth element, E denotes at least one element selected from the group consisting of Mn, Al, Ga, Ge, In, Sn and platinum family element, Z denotes at least one element selected from the group consisting of C, N and P, and c, d, e, f, g and h satisfy relation formulas: $0.01 \leq c \leq 8$ at %, $0.01 \leq d \leq 10$ at %, $0 \leq e \leq 10$ at %, $10 \leq f \leq 25$ at %, $3 \leq g \leq 12$ at %, $15 \leq f+g+h \leq 35$ at %, respectively, in which 20% or more in area ratio of the alloy structure is composed of microstructure having a grain size of 50 nm or less.

In the above general formula (2), A element is used for increasing corrosion resistance of the alloy, for preventing the crystal grains from being coarsened, and for improving the magnetic characteristics such as iron loss, permeability of the alloy. When the content of A element is excessively small, it becomes difficult to obtain an effect of suppressing the coarsening of the crystal grains. In contrast, when the content of A element is excessively large, the magnetic characteristics are disadvantageously deteriorated. Accordingly, it is preferable to set the content of A element to within a range of 0.01 to 8 at %. Element D is effective for unifying the crystal grain size, and for reducing the magneto striction. It is preferable to set the content of D element to within a range of 0.01 to 10 at %.

E element is effective for improving soft-magnetic property and the corrosion resistance of the alloy. It is preferable to set the content of E element to within a range of 10 at % or less. Si and B are elements for promoting to make the alloy amorphous at a time of manufacturing the magnetic sheet. It is preferable to set the Si content to within a range of 10 to 25 at %, and it is preferable to set the B content to within a range of 3 to 12 at %. As an element for promoting to make the alloy amorphous, Z element other than Si and B may be contained in the alloy. In this case, it is preferable to set a total content of Si, B and Z element to within a range of 15 to 35 at %. It is preferable that the micro crystalline structure is formed so as to realize a structure in which 50 to 90% in area ratio of the crystal grains having a grain size of 5 to 30 nm are existing in the alloy structure.

The amorphous magnetic alloy sheet (thin ribbon) to be used as the magnetic sheet for the present invention can be manufactured through, for example, a roll quenching method (molten metal quenching method). Concretely, the magnetic sheet is manufacture through a method comprising the steps of: preparing an alloy raw material; melting the alloy raw material to prepare a molten alloy; and rapidly quenching the molten alloy.

The micro crystalline magnetic alloy sheet can be obtained through, for example, a method comprising the steps of: preparing amorphous alloy sheet (thin ribbon) by a molten metal quenching method; and conducting a heat treatment at a temperature of −50° C. to +120° C. from the crystallization temperature of the amorphous alloy for one minute to 5 hours thereby to precipitate micro crystalline grains. The micro crystalline magnetic alloy sheet can be also obtained through a method in which a quenching rate of the molten metal quenching method is controlled and the micro crystal grains are directly precipitated.

In a case where a roll quenching method is used, when an injection rate of the molten alloy or rotation speed of the roll is controlled, a thickness of the resultant magnetic sheet can be controlled. Further, regarding to permalloy, a plate member is prepared from the molten alloy having a specified composition, and thereafter, the plate member is subjected to a rolling operation thereby to manufacture the magnetic sheet.

In order to control the relative permeability of the alloy, a heat treatment and a division is effective. For example, in case of a Co-type amorphous sheet having a composition of $CO_{70}Fe_5Si_5B_{20}$ (atomic ratio) and a thickness of 20 μm, the amorphous sheet has a relative permeability of about 3000 at 135 kHz. However, when the amorphous sheet is subjected a heat treatment at 350° C. for 30 minutes, a relative permeability of about 10000 can be obtained. While, when the amorphous sheet is subjected a heat treatment at 440° C. for 60 minutes, a relative permeability of about 50000 can be obtained. Further, when the amorphous sheet, which is formed by a heat treatment of 440° C. for 60 minutes, is divided, the relative permeability can be varied within a range of 1000 to 50000.

Although the permeability of the same material, the heat treatment and the division are explained, a combination of magnetic bodies each composed of different material can be also used. For example, the permeability of about 1500 can be controlled in a silicon steel, the permeability of about 3000 can be controlled in a 50% Ni permalloy, the permeability of about 15000 can be controlled in a 80% Ni permalloy, and the permeability of about 5000 can be controlled in an Fe amorphous alloy.

The non-contact type power receiving apparatus according to the present invention comprises the composite magnetic body having at least two magnetic sheets, and the composite magnetic body is provided to at least one portion of a portion between the secondary battery and the spiral coil, and a portion between the electronic device and the spiral coil. The provision of the composite magnetic body to the portion between the secondary battery and the spiral coil and the portion between the electronic device and the spiral coil means a state where a positional relation of the secondary battery/the composite magnetic body/the spiral coil, or a positional relation of the electronic device/the composite magnetic body/the spiral coil are maintained.

Therefore, the present invention is not limited to the structure in which the respective constitutional elements are directly laminated in a form of the secondary battery/the composite magnetic body/the spiral coil, as shown in FIG. 1. For example, a structure in a form of the electronic device/the circuit board/the composite magnetic body/the secondary battery/the spiral coil as shown in FIG. 2 is included in the structure in which the composite magnetic body is provided to a portion between the electronic device and the spiral coil. That is, the present invention does not exclude a structure in which the other structural elements such as circuit board or the like are provided therebetween, and a structure in which the other constitutional elements are substantially provided to a portion between the electronic device and the spiral coil is included in a scope of the present invention. In case of the provision of the other element to a portion between the secondary battery and the spiral coil, the same concept is applied.

The non-contact type power receiving apparatus as described above can be mounted on various electronic apparatus. Examples of the electronic apparatus may include: cellular phone, portable audio device, digital camera, handy camera (moving image-recording camera), codeless phone, notebook type personal computer (lap-top type personal computer), portable type game machine, or the like. These electronic apparatuses can be driven by the secondary battery, so that these electronic apparatuses are all portable electronic apparatuses capable of being driven in a state of codeless.

Figure 4:
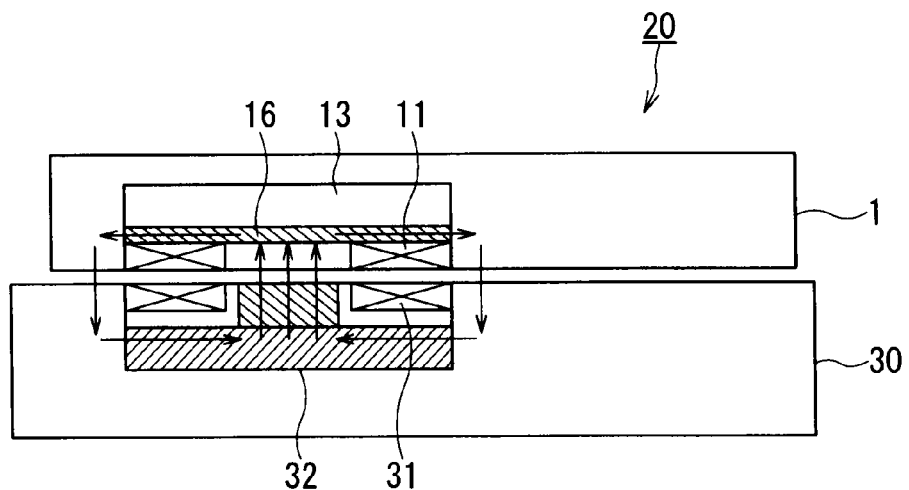
FIG. 4 is a cross sectional view showing one embodiment of a power charging system according to the present invention.

FIG. 4 shows one embodiment of a charging system 20 using the non-contact type power receiving apparatus. The charging system 20 comprises: a power receiving apparatus 1; a spiral coil (secondary coil) provided to a side of the power receiving apparatus, the secondary battery 13, the composite magnetic body 16, a charging apparatus 30, a spiral coil (primary coil) 31 provided to a side of the charging apparatus; and a magnetic core 32 for the primary coil.

The mechanism of charging operation is as follows. At first, an alternating voltage from an electric power source (not shown) is applied to the spiral coil 31 provided to a side of the charging apparatus 30, whereby magnetic flux is generated at the spiral coil 31 provided to the side of the charging apparatus 30. The magnetic flux generated at the spiral coil 31 is then transmitted to the spiral coil 11 provided to the side of the power receiving apparatus, the spiral coil 11 being provided in a non-contacted state to the spiral coil 31 provided to the side of the charging apparatus.

The spiral coil 11 of the power receiving apparatus side receives the magnetic flux thereby to generate alternating voltage by electromagnetic induction. This alternating voltage is rectified by the rectifier 12. A direct voltage rectified by the rectifier 12 is charged to the secondary battery 13. According to this charging system 20, a transmission of the electrical power is performed in a non-contacted state.

According to the power receiving apparatus of this invention, the composite magnetic body is provided to a predetermined portion, so that the resonating property is improved, and a shielding effect can be also improved while optimizing a sufficient bondage between the primary coil and the secondary coil and the suppression of inductance variation of the primary coil. As a result, a transmission rate of the magnetic flux transmitted from the primary coil (coil of the charging apparatus side) is excellent, a charging efficiency can be improved. In addition, the shielding effect is also excellent, so that the heat generation during the charging operation can be also suppressed.

As described above, the portable type electronic apparatuses are made compact in thickness and size. Therefore, the circuit board onto which the power receiving system and the electronic devices are mounted is required to be compactly accommodated into a casing or the like.

However, according to the present invention, the heat generation during the charging operation is suppressed, so that heat affection to the circuit parts such as the electronic devices can be effectively prevented. According to the power receiving apparatus of the present invention, it becomes also possible to decrease a total thickness of the composite magnetic body and the spiral coil of the power receiving apparatus side, and the total thickness can be reduced to be thin (0.5 mm or less).

Further, among various secondary batteries, Li-ion secondary battery has a large capacity, so that the Li-ion secondary battery has been used as a driving power source of the electronic apparatuses. However, the Li-ion secondary battery has a small resistance against heat. When the Li-ion secondary battery is hated to some extent, there may be a fear that carbon dioxide ($CO_2$) gas is inevitably generated at inside the battery. According to the present invention, the shielding effect is improved thereby to suppress the heat generation, an adverse influence on the secondary battery can be effectively prevented. In other words, the present invention is suitably applied to a power receiving apparatus onto which a Li-ion secondary battery having a weak heat resistance is mounted.

EXAMPLE

Charging System

As a non-contact type charging system, there was prepared a charging system for cellular phone. In a charging apparatus, an electric power from AC power source is converted into a constant electromagnetic wave through a control circuit, and a primary coil for transmitting the electromagnetic wave is provided to a portion close to a mounting board. A power receiving apparatus has a structure so as to comprise: a secondary coil composed of a spiral coil provided in a cellular phone; a rectifier for rectifying the electromagnetic wave received by the secondary coil; a circuit board for mounting the rectifier; and a secondary battery.

In this regard, the primary coil is formed by winding a copper wire so as to provide a shape having outer diameter of 40 mm and inner diameter of 5 mm. A magnetic body having a relative permeability of ($\mu 1$) 100, a thickness (d1) of 0.5 mm, a size of 45 mm×45 mm was provided. A power receiving system is configured by comprising: a secondary coil formed by winding the copper wire so as to provide a shape having outer diameter of 30 mm and inner diameter of 10 mm; and the magnetic body is provided through the secondary coil to a side opposing to the charging system. The magnetic body is composed of a composite magnetic body which is formed by laminating at least two layers of the magnetic sheets. The composite magnetic bodies used in the respective Examples are as follows.

Example 1

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 200° C. for 30 minutes. The heat-treated sheet was worked to provide a size of 35 mm×35 mm. A polycarbonate resin having a thickness of 25 μm was attached to both surfaces of the worked sheet through an adhesive layer having a thickness of 10 μm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 60 minutes. The heat-treated sheet was worked to provide a size of 35 mm×35 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Example 1.

Example 2

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, then the segments were arranged in a area of 35 mm×35 mm thereby to prepare a first magnetic sheet.

On the other hand, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 250° C. for 30 minutes. The heat-treated sheet was worked to provide a size of 20 mm×20 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Example 2.

Example 3

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, then the segments were arranged in a area of 35 mm×35 mm thereby to prepare a first magnetic sheet.

On the other hand, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide a size of 20 mm×20 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Example 3.

Example 4

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, then the segments were arranged in a area of 35 mm×35 mm thereby to prepare a first magnetic sheet.

On the other hand, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 20 mm×20 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Example 4.

Example 5

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, then the segments were arranged in a area of 35 mm×35 mm thereby to prepare a first magnetic sheet.

On the other hand, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 250° C. for 30 minutes. The heat-treated sheet was worked to provide a size of 25 mm×25 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Example 5.

Example 6

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to one surface of the divided segment through an adhesive layer having a thickness of 10 μm, and a polycarbonate resin having a thickness of 50 μm was attached to another surface of the divided segment through an adhesive layer having a thickness of 30 μm, then the segments were arranged in an area of 35 mm×35 mm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide a size of 20 mm×20 mm. A polycarbonate resin having a thickness of 25 μm was attached to one surface of the worked sheet through an adhesive layer having a thickness of 10 μm, and a polycarbonate resin having a thickness of 50 μm was attached to another surface of the worked sheet through an adhesive layer having a thickness of 30 μm, thereby to prepare a second magnetic sheet. Subsequently, thus prepared first and second magnetic sheets were adhered through an adhesive layer having a thickness of 10 μm thereby to manufacture a composite magnetic body for Example 6.

Example 7

A composite magnetic body adjacent to the secondary coil was prepared in the following manner. Namely, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to one surface of the divided segment through an adhesive layer having a thickness of 10 μm, then the segments were arranged in an area of 35 mm×35 mm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide a size of 20 mm×20 mm. A polycarbonate resin having a thickness of 25 μm was attached to one surface of the worked sheet through an adhesive layer having a thickness of 10 μm, thereby to prepare a second magnetic sheet. Subsequently, thus prepared first and second magnetic sheets were adhered, at surfaces onto which the polycarbonate resins were not attached, through an adhesive layer having a thickness of 20 μm thereby to manufacture a composite magnetic body for Example 7.

Example 8

A composite magnetic body adjacent to the secondary coil was prepared in the following manner. Namely, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 5 mm×5 mm. A polycarbonate resin having a thickness of 25 μm was attached to both surfaces of the divided segment through an adhesive layer having a thickness of 10 μm, then the segments were arranged in an area of 35 mm×35 mm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide two segments each having a size of 35 mm×35 mm. A polycarbonate resin having a thickness of 25 μm was attached to one surface of the respectively worked two sheets through an adhesive layer having a thickness of 10 μm, thereby to prepare a second and a third magnetic sheets. Subsequently, thus prepared first, second and third magnetic sheets were adhered, at surfaces onto which the polycarbonate resins were not attached, through an adhesive layer having a thickness of 10 μm thereby to manufacture a composite magnetic body for Example 8.

Example 9

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, then the segments were arranged in an area of 35 mm×35 mm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide two segments each having a size of 20 mm×20 mm. A polycarbonate resin having a thickness of 25 μm was attached to one surface of the respectively worked two sheets through an adhesive layer having a thickness of 10 μm, thereby to prepare a second and a third magnetic sheets. Subsequently, thus prepared first, second and third magnetic sheets were adhered, at surfaces onto which the polycarbonate resins were not attached, through an adhesive layer having a thickness of 10 μm thereby to manufacture a composite magnetic body for Example 9.

Example 10

A composite magnetic body adjacent to the secondary coil was prepared in the following manner. Namely, there was prepared a Co-type amorphous sheet (ribbon) having a composition of $Co_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, then the segments were arranged in a area of 35 mm×35 mm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide a size of 35 mm×35 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Example 10.

Example 11

A composite magnetic body adjacent to the secondary coil was prepared in the following manner. Namely, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm.

On the other hand, flat and fine grains (average grain size: 5 μm) of Sendust was dispersed in silicone resin thereby to prepare a paste. Thus prepared paste was coated onto both surfaces of the segments (magnetic bodies), followed by drying the paste, thereby to prepare the coated segments each having a total thickness of 30 μm. Then, the coated segments were arranged in a area of 35 mm×35 mm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 35 μm. Then, the Co-type amorphous sheet was subjected to a heat treatment at 350° C. for 30 minutes. The heat-treated sheet was worked to provide a size of 20 mm×20 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 30 μm thereby to manufacture a composite magnetic body for Example 11.

Example 12

A composite magnetic body adjacent to the secondary coil was prepared in the following manner. Namely, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to one surface of the divided segment through an adhesive layer having a thickness of 10 μm, then the segments were arranged in a area of 35 mm×35 mm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide a size of 20 mm×20 mm. A polycarbonate resin having a thickness of 25 μm was attached to one surface of the worked sheet through an adhesive layer having a thickness of 10 μm, thereby to prepare a second magnetic sheet. Subsequently, thus prepared first and second magnetic sheets were adhered, at surfaces onto which the polycarbonate resins were not attached, through an adhesive layer having a thickness of 10 μm thereby to manufacture a composite magnetic body for Example 12.

Comparative Example 1

In the above power receiving apparatus, the composite magnetic body adjacent to the secondary coil was prepared in the following manner. Namely, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. A polycarbonate resin having a thickness of 25 μm was attached to both surfaces of the worked sheet through an adhesive layer having a thickness of 10 μm thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 350° C. for 30 minutes. The heat-treated sheet was worked to provide a size of 20 mm×20 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Comparative Example 1.

Comparative Example 2

A composite magnetic body adjacent to the secondary coil was prepared in the following manner. Namely, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, thereby to prepare a first magnetic sheet.

On the other hand, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 200° C. for 30 minutes. The heat-treated sheet was worked to provide a size of 20 mm×20 mm. A polycarbonate resin having a thickness of 25 μm was attached to both surfaces of the worked sheet through an adhesive layer having a thickness of 10 μm thereby to prepare a second magnetic sheet. Subsequently, thus prepared first and second magnetic sheets were adhered through an adhesive layer having a thickness of 10 μm thereby to manufacture a composite magnetic body for Comparative Example 2.

Comparative Example 3

A composite magnetic body adjacent to the secondary coil was prepared in the following manner. Namely, there was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 440° C. for 60 minutes. The heat-treated sheet was worked to provide a size of 35 mm×35 mm. Further, the worked sheet was divided into small segments each having a size of 3 mm×3 mm. A polycarbonate resin having a thickness of 25 μm was attached to both surfaces of the divided segment through an adhesive layer having a thickness of 10 μm, then the segments were arranged in a area of 35 mm×35 mm thereby to prepare a single-layered magnetic sheet.

Comparative Example 4

There was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 460° C. for 30 minutes. The heat-treated sheet was worked to provide a size of 35 mm×35 mm. A polycarbonate resin having a thickness of 25 μm was attached to both surfaces of the worked sheet through an adhesive layer having a thickness of 10 μm, thereby to prepare a single-layered magnetic sheet.

Comparative Example 5

There was prepared a Co-type amorphous sheet (ribbon) having a composition of $CO_{70}Fe_5Si_5B_{20}$ (atomic ratio), a saturation magnetic flux density Ms of 0.55, and an average thickness (t) of 20 μm. Then, the Co-type amorphous sheet was subjected to a heat treatment at 460° C. for 30 minutes. The heat-treated sheet was worked to provide a size of 35 mm×35 mm. A polycarbonate resin having a thickness of 25 μm was attached to both surfaces of the sheets through an adhesive layer having a thickness of 10 μm. Thus prepared two magnetic sheets were adhered through an adhesive layer having a thickness of 10 μm, thereby to prepare a magnetic sheet.

With respect to thus prepared charging systems using the non-contact type power receiving apparatus according to the respective Examples and Comparative Examples, the structure of the used composite magnetic body, the resonating property of the charging system and shielding property (febrile state) were evaluated, thereby to obtain the results shown in Table 1 hereunder.

In this connection, as operating conditions of the charging systems, a transmission current was set to 1 A, and a transmission power was set to 1.5 W. In order to evaluate the shielding property, a battery was disposed to a rear surface of the secondary coil and the magnetic device.

The criteria of the evaluation are as follows. Namely, after completion of the electrical transmission for one hour, when a temperature rise was 35° C. or higher, the shielding property was evaluated to be "NG" (not good: with a symbol of x), while when the temperature rise was 33° C. or higher and lower than 35° C., the shielding property was evaluated to be "good" with a symbol of Δ, and when the temperature rise was lower than 33° C., the shielding property was evaluated to be "excellent" with a symbol ◯.

Further, the criteria for evaluating the resonation property are as follows. Namely, in a case where the primary coil could receive 100% of RF-ID tag signal provided to the battery, the resonation property was evaluated to be "excellent" with a symbol of ◯, while in a case where a frequency of error in the signal receiving operation was lower than 5%, the resonation property was evaluated to be "good" with a symbol of Δ, and in a case where the frequency of error was 5% or higher, the resonation property was evaluated to be "NG" (not good: with a symbol of x).

TABLE 1

| Sample No. | Relative Permeability μd. | Size of Magnetic Body [mm□] | Thickness of Magnetic Body td [mm] | μd · td [mm] | Relative Permeability μu | Size of Magnetic Body [mm□] | Thickness of Magnetic Body [mm] |
|---|---|---|---|---|---|---|---|
| Example 1 | 3000 | 35 | 0.02 | 60 | 5000 | 35 | 0.02 |
| Example 2 | 1000 | 35 | 0.02 | 20 | 5000 | 20 | 0.02 |
| Example 3 | 1000 | 35 | 0.02 | 20 | 10000 | 20 | 0.02 |
| Example 4 | 1000 | 35 | 0.02 | 20 | 50000 | 20 | 0.02 |
| Example 5 | 1000 | 35 | 0.02 | 20 | 5000 | 25 | 0.02 |
| Example 6 | 1000 | 35 | 0.02 | 20 | 10000 | 20 | 0.02 |
| Example 7 | 1000 | 35 | 0.02 | 20 | 10000 | 20 | 0.02 |
| Example 8 | 3000 | 35 | 0.02 | 60 | 5000 | 35 | 0.02 × 2 Sheets |
| Example 9 | 1000 | 35 | 0.02 | 20 | 5000 | 35 | 0.02 × 2 Sheets |
| Example 10 | 1000 | 35 | 0.02 | 20 | 10000 | 35 | 0.02 |
| Example 11 | 1000 | 35 | 0.02 | 20 | 10000 | 20 | 0.02 |
| Example 12 | 1000 | 35 | 0.02 | 20 | 10000 | 20 | 0.02 |
| Comparative Example 1 | 5000 | 35 | 0.02 | 100 | 10000 | 20 | 0.02 |
| Comparative Example 2 | 1000 | 35 | 0.02 | 20 | 3000 | 20 | 0.02 |
| Comparative Example 3 | 1000 | 35 | 0.02 | 20 | — | — | — |
| Comparative Example 4 | — | — | — | — | 10000 | 35 | 0.02 |

TABLE 1-continued

| | | | | | | |
|---|---|---|---|---|---|---|
| Comparative Example 5 | — | — | — | — | 10000 | 35 | 0.02 × 2 Sheets |

| Sample No. | μu·tu [mm] | μu·tu/ μd·td | Distance between two Layers | Total Thickness [mm] | Resonating Property | Shielding Property (Heat Generation) |
|---|---|---|---|---|---|---|
| Example 1 | 100 | 1.7 | 0.080 | 0.190 | Δ | ○ |
| Example 2 | 100 | 5 | 0.080 | 0.190 | ○ | Δ |
| Example 3 | 200 | 10 | 0.080 | 0.190 | ○ | ○ |
| Example 4 | 1000 | 50 | 0.080 | 0.190 | ○ | ○ |
| Example 5 | 100 | 5 | 0.080 | 0.190 | Δ | Δ |
| Example 6 | 200 | 10 | 0.190 | 0.300 | ○ | ○ |
| Example 7 | 200 | 10 | 0.020 | 0.130 | Δ | ○ |
| Example 8 | 200 | 3.3 | 0.125 | 0.255 | Δ | ○ |
| Example 9 | 200 | 3.3 | 0.125 | 0.255 | Δ | ○ |
| Example 10 | 200 | 10 | 0.080 | 0.190 | Δ | ○ |
| Example 11 | 200 | 10 | 0.110 | 0.250 | ○ | Δ |
| Example 12 | 200 | 10 | 0.110 | 0.120 | Δ | ○ |
| Comparative Example 1 | 200 | 2 | 0.080 | 0.190 | × | ○ |
| Comparative Example 2 | 60 | 3 | 0.080 | 0.190 | ○ | × |
| Comparative Example 3 | — | — | 0.000 | 0.090 | ○ | × |
| Comparative Example 4 | 200 | — | 0.000 | 0.090 | × | ○ |
| Comparative Example 5 | 400 | — | 0.080 | 0.190 | × | ○ |

As is obvious from the results shown in the above Table 1, the power receiving apparatuses according to the respective Examples were excellent and good in resonation property and shielding property.

INDUSTRIAL APPLICABILITY

According to the present invention, the composite magnetic body comprising a plurality of magnetic sheets (magnetic ribbons) is provided to at least one portion between the spiral coil (power receiving side spiral coil: a secondary coil) and the secondary battery, and a portion between the rectifier and the spiral coil. Therefore, magnetic flux generated from a power charging side spiral coil (a primary coil) is prevented from interlinking with a circuit board and the secondary battery or the like, and inductance variation in the preliminary coil, which is caused by absence or presence of the secondary coil, is controlled while noise and heat generation originated by induced electromotive force (electromagnetic induction) are suppressed, so that a resonating property of a resonance circuit constituted by the primary coil is improved whereby an oscillation can be effectively controlled.

The invention claimed is:

1. A non-contact type power receiving apparatus comprising:
    a power receiving coil having a spiral coil;
    a rectifier for rectifying alternative voltage generated at the power receiving coil;
    a secondary battery for being charged with direct voltage which is rectified by the rectifier;
    an electronic device operated by being supplied with the direct voltage from the secondary battery; and
    a composite magnetic body which is provided as at least one of a first portion between the secondary battery and the spiral coil, and a second portion between the electronic device and the spiral coil,
    wherein said composite magnetic body comprises at least two layers including first and other layers of magnetic sheets through an insulating layer in which when a relative magnetic permeability of the first magnetic sheet provided to a side of the spiral coil is denoted as $\mu d$, a thickness of the first magnetic sheet is denoted as $td$, an average relative magnetic permeability of the other layers of magnetic sheets other than the first magnetic sheet is denoted as $\mu u$, and a total thickness of the other layers of magnetic sheets is denoted as $tu$, where said composite magnetic body satisfies the following relations:

$\mu d \cdot td \leq 60$ [mm]; and $\mu u \cdot tu \geq 100$ [mm], wherein said magnetic sheets are formed of at least one material selected from a group consisting of Co-type amorphous alloy, Fe-type amorphous alloy, Fe-type micro-crystalline alloy, permalloy, and silicon steel, and the magnetic sheets have an average thickness of 100 μm or less.

2. The non-contact type power receiving apparatus according to claim 1, wherein said composite magnetic body satisfies the following relation:

$(\mu u \cdot tu)/(\mu d \cdot td) \geq 10$.

3. The non-contact type power receiving apparatus according to claim 2, wherein said first magnetic sheet has a surface area larger than that of the other layers of the magnetic sheets constituting the composite magnetic body.

4. The non-contact type power receiving apparatus according to claim 2, wherein said insulating layer of the composite magnetic body is composed of resin containing magnetic powder.

5. The non-contact type power receiving apparatus according to claim 2, wherein a distance between the first magnetic sheet and the other magnetic sheets is 30 μm or more.

6. The non-contact type power receiving apparatus according to claim 2, wherein a total thickness of the composite magnetic body is 0.3 mm or less.

7. The non-contact type power receiving apparatus according to claim 2, wherein said secondary battery is a Li-ion secondary battery.

8. An electronic equipment comprising the non-contact type power receiving apparatus according to claim 2.

9. The non-contact type power receiving apparatus according to claim 1, wherein said first magnetic sheet has a surface area larger than that of the other layers of the magnetic sheets constituting the composite magnetic body.

10. The non-contact type power receiving apparatus according to claim 1, wherein said insulating layer of the composite magnetic body is composed of resin containing magnetic powder.

11. The non-contact type power receiving apparatus according to claim 1, wherein a distance between the first magnetic sheet and the other magnetic sheets is 30 μm or more.

12. The non-contact type power receiving apparatus according to claim 1, wherein a total thickness of the composite magnetic body is 0.3 mm or less.

13. The non-contact type power receiving apparatus according to claim 1, wherein said secondary battery is a Li-ion secondary battery.

14. An electronic equipment comprising the non-contact type power receiving apparatus according to claim 1.

15. A charging system comprising:
    the electronic equipment according to claim 14; and
    the non-contact type power receiving apparatus provided to the electronic equipment so as to allow the non-contact type power receiving apparatus to charge electricity to the electronic equipment.

* * * * *